Figure 8:
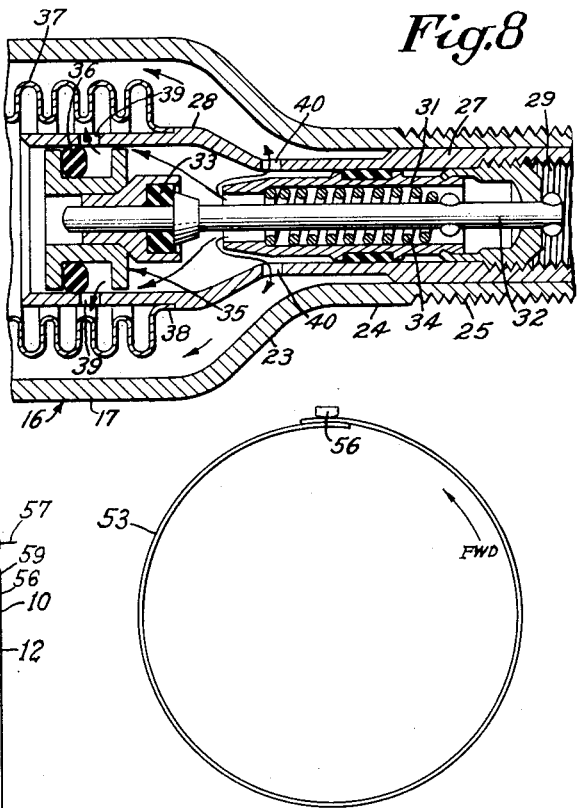

May 29, 1951  J. B. SHEA  2,554,594
TIRE PRESSURE INDICATING SYSTEM
Filed May 26, 1950 2 Sheets-Sheet 1
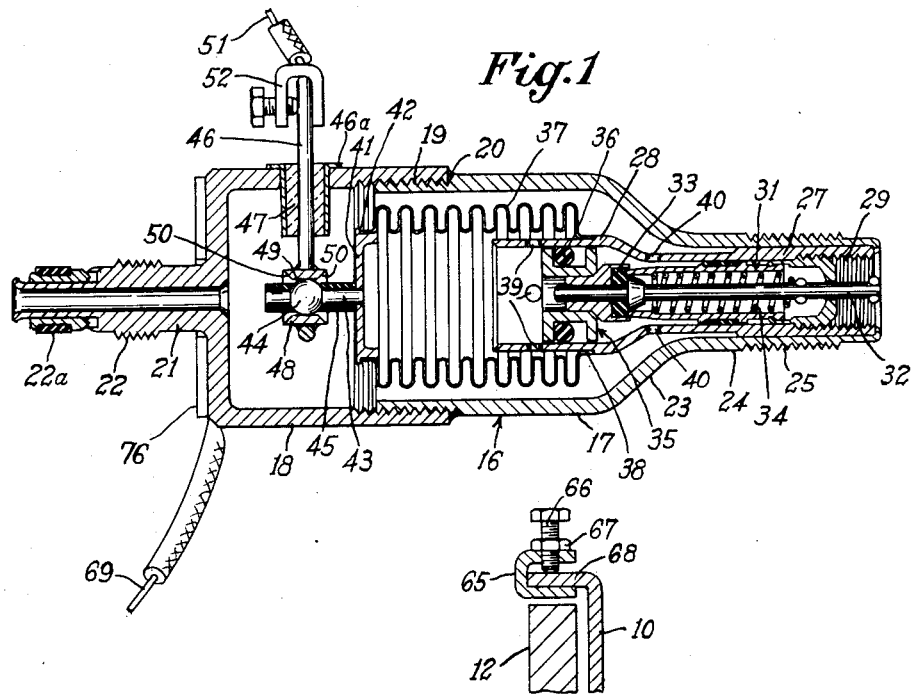
Fig. 1
Fig. 4
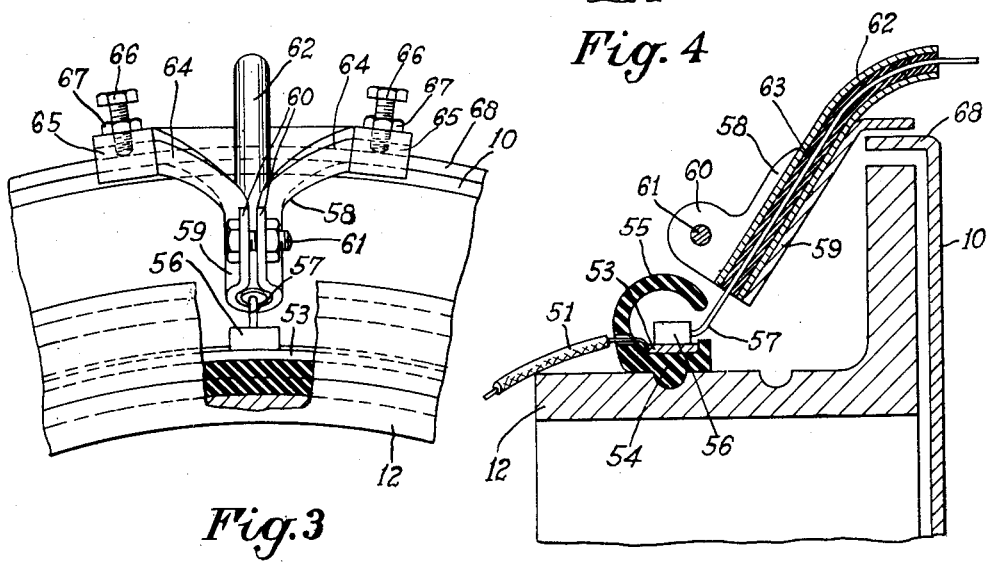
Fig. 3
Fig. 2
INVENTOR.
James B. Shea
BY
ATTORNEYS May 29, 1951  J. B. SHEA  2,554,594
TIRE PRESSURE INDICATING SYSTEM
Filed May 26, 1950  2 Sheets-Sheet 2

INVENTOR.
James B. Shea
BY
Frease and Bishop
ATTORNEYS

Patented May 29, 1951

2,554,594

UNITED STATES PATENT OFFICE 2,554,594

TIRE PRESSURE INDICATING SYSTEM

James B. Shea, Dover, Ohio, assignor of one-half to John B. Sproul, Dover, Ohio

Application May 26, 1950, Serial No. 164,339

4 Claims. (Cl. 177—311)

The invention relates to apparatus for indicating the pressure of tires upon vehicles, and more particularly to apparatus of this character which will operate as a safety device to warn the driver of a motor vehicle when any tire upon the vehicle is improperly inflated.

For a pneumatic tire of any given type, a certain pressure is required for normal operation and any considerable drop in pressure below this point is detrimental to the tire. On the other hand, under normal operating conditions, road friction produces a high temperature causing increase in pressure in the tires.

If this pressure increases beyond a certain point, there is danger of a tire blowing out, which may cause not only serious damage to the motor vehicle but also serious injury or death to the occupants of the same.

It is therefore an object of the present invention to provide a device which will indicate to the driver of the vehicle, at all times, whether the tires are properly inflated and will indicate immediately whether the pressure in any tire or tires has dropped below or risen above the danger point.

Another object is to provide such a device including a pressure sensing unit located in the valve stem of each tire and connected by an electric circuit to a signal which may be mounted on the instrument panel or other location within the vehicle for giving warning to the driver when the tire pressure has dropped below or risen above the danger point.

A further object is to provide such a device in which the conventional tire valve or a similar suitable valve is located within each pressure sensing unit which is inserted into the valve stem of the tire.

A still further object is to provide a pressure sensing unit of this type containing a bellows adapted to receive the same pressure as the tire, when the tire is inflated, and to hold this pressure independently of pressure which is in the tire, whereby a rise or fall in the tire pressure, beyond the danger point, will cause the bellows to operate an electrical pick-off or make and break device which controls a warning signal.

Another object is to provide apparatus of the character referred to in which a slip ring upon the brake drum, or other rotating part of the vehicle wheel, is located in the electric circuit between the pressure unit in the valve stem of the tire and the warning signal.

Figure 5:
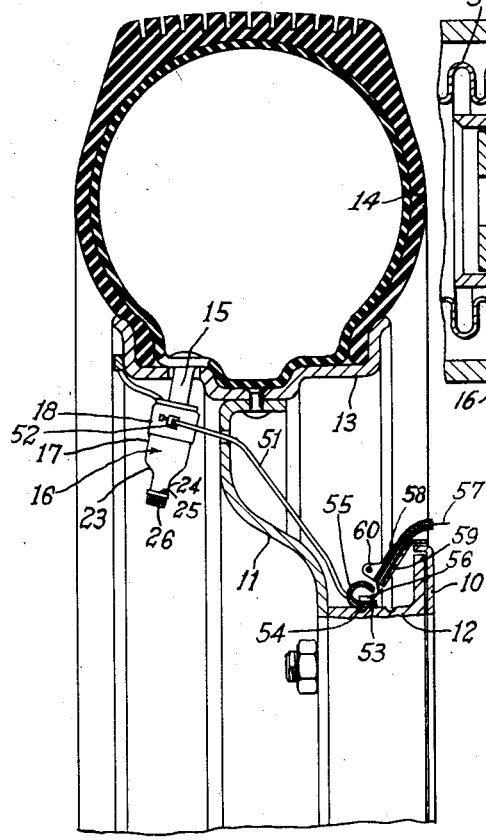
Figure 7:
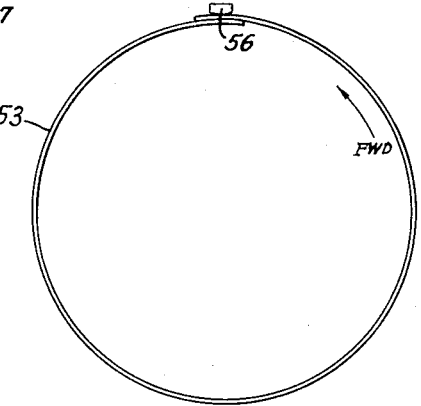
Figure 6:
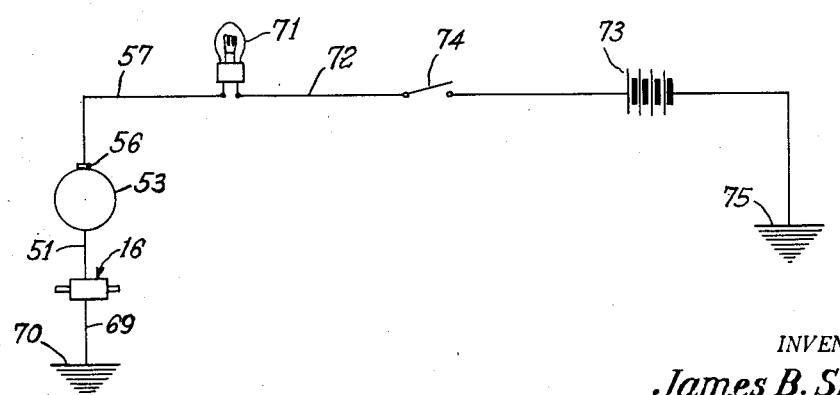

The above objects together with others which will be apparent from the drawings and following description, may be attained, the above described difficulties overcome and the advantages and results obtained, by the apparatus, construction, arrangement and combinations, sub-combinations and parts, which comprise the present invention, a preferred embodiment of which, illustrative of the best mode in which applicant has contemplated applying the principle, being set forth in detail in the following description and illustrated in the accompanying drawings, in which;

Figure 1 is an enlarged, longitudinal, sectional view through the pressure sensing unit which is adapted to be inserted into the valve stem of a tire;

Fig. 2 a fragmentary sectional view of a portion of the brake drum of an automobile wheel, and an adjacent portion of the fixed wheel, showing the slip ring mounted upon and insulated from the brake drum, and the bracket connected to the fixed wheel for supporting and insulating the electric wire leading from the shoe upon the slip ring to the warning signal;

Fig. 3 a fragmentary elevation of the parts shown in Fig. 2 with parts broken away for the purpose of illustration;

Fig. 4 a fragmentary, sectional view showing the manner in which the bracket shown in Figs. 2 and 3 is rigidly attached to the fixed wheel;

Fig. 5 a fragmentary, transverse, sectional view through a portion of an automobile wheel and tire showing parts of the improved tire pressure indicating apparatus associated therewith;

Fig. 6 a wiring diagram of the circuit between each tire and the warning signal therefor;

Fig. 7 a side elevation of the slip ring, showing the manner in which the slip ring may be formed from a strip of metal; and Fig. 8 a fragmentary, longitudinal, sectional view through a portion of the pressure sensing unit, on a larger scale than Fig. 1, showing the valves in open position.

Referring now more particularly to the construction illustrated in the accompanying drawings, in which similar numerals refer to similar parts throughout, a portion of the fixed wheel of an automotive vehicle wheel is shown at 10, the rotating wheel at 11, the brake drum at 12, the wheel rim at 13, the tire at 14 and the tire valve stem at 15.

All of these parts may be of usual and well-known construction and design and in themselves form no part of the present invention, but are shown and described in order to properly disclose the manner in which the invention is applied thereto.

The invention includes a pressure sensing unit, indicated generally at 16, adapted to be inserted into the valve stem 15 of each tire, in place of the usual tire valve, and the tire valve is located in the outer end of this pressure unit, as will be later described in detail.

This pressure sensing unit is located within a housing formed of the two members 17 and 18, connected together as by the screw threads 19 and having a pressure-tight seal 20 formed at the joint. The member 18 of the housing has a reduced, tubular neck 21, externally screw threaded as at 22, for attachment within the valve stem 15 of a tire, in place of the usual tire valve, and provided with the gasket 22a so as to form a pressure-tight seal.

The outer end of the housing member 17 is tapered, as at 23 and terminates in the reduced neck 24, externally screw threaded as at 25, to receive the usual tire valve cap 26.

A tubular member 27 is fixed within the tubular neck 24 of the housing member 17, and extends inwardly into the housing, terminating in the enlarged, cylindrical valve casing portion 28. The outer end of this tubular member 27 is internally screw threaded as at 29, to receive the externally threaded outer end portion of a conventional tire valve, indicated generally at 31. This tire valve, as in usual practice, may include the usual valve stem 32, having the valve 33 at its inner end, normally held in closed position by the usual coil spring 34.

A normally closed valve, indicated generally at 35, is connected to the inner end of the tire valve, as best shown in Fig. 1. This valve 35 is in the form of an annular channel-shape member, slidable within the enlarged cylindrical portion 28 of the tubular member 27, and has mounted therein a soft rubber toroidal ring 36.

A flexible bellows 37, which may be formed of sheet brass or other such suitable material, is connected at its outer end to the exterior of the cylindrical valve casing portion 28 of the tubular member 27, as indicated at 38, in such manner as to form a pressure-tight seal.

One or more openings 39 are provided in the cylindrical portion 28, providing communication between the interior thereof and the interior of the bellows, and a similar opening or openings 40 are provided in the tubular member 27 forming communication between the interior thereof and the interior of the housing 16.

An inner end wall 41 is connected to the inner end of the bellows 37, as indicated at 42, in such manner as to form a pressure-tight seal. An axially disposed rod 43, of suitable metal to form an electrical conductor, is connected to the end wall 41 of the bellows and has an enlargement or ball portion 44 formed thereon. The rod 43 is preferably surrounded by an insulation sleeve 45 at each side of the ball portion 44 thereof.

An electrical conductor 46 is radially mounted within the housing by a pressure-tight seal 46a, being shown as located through an insulation member 47 located through one side wall of the section 19 of the housing. A ring portion 48 is formed at the inner end of the conductor 46 and so located that the ball portion 44 has a sliding fit therein in order to provide an electrical pickoff or make and break device.

The ring portion 48 is preferably of the cross sectional shape shown in Fig. 1, having the cylindrical inner surface 49, with which the ball portion 44 slidably contacts and the bevelled outer edges 50 to guide the ball portion 44 into the ring from either side and to provide for breaking the circuit when the ball portion 44 passes out of contact with the cylindrical inner surface 49 of the ring.

A wire 51 is connected to the outer end of the conductor 46, as by the clamp 52, and leads to the slip ring 53, formed of copper, bronze or other suitable electrical conducting metal and located around the brake drum 12, as indicated in Figs. 2, 3, 5 and 6.

This slip ring is insulated from the brake drum by means of an insulation ring 54, which may be formed of any suitable insulation material such as plastic or rubber, and is preferably provided with a curved, annular guard flange 55 to protect the slip ring and the shoe 56 which cooperates therewith.

This shoe is formed of any suitable electrical conducting brush material and is held in stationary position relative to the slip ring. For this purpose the shoe 56 is carried by an electrical conductor 57 having a sufficient spring characteristic to hold the shoe 56 in sliding contact with the slip ring 53 so as to make electrical contact between said members.

For this purpose a bracket, such as indicated generally at 58 in Figs. 2, 3 and 5, is mounted upon the fixed wheel 10 for supporting the shoe 56. This bracket has the central, split, tubular portion 59 having opposed ears 60 for receiving a bolt 61 for clamping the same together around the tube 62, having suitable insulation 63 therein through which the wire 57 is located.

The upper end of the bracket 58 flares outwardly at each side away from the center, as indicated at 64, and is provided at each end with a channel-shape clamping member 65, provided with a clamping bolt 66 and lock nut 67 for clamping the same upon the annular rim 68 of the fixed wheel 10.

A lockwasher 76 serves to lock the pressure sensing unit as shown in Fig. 1 to the tire stem 15 and to provide a means to ground said unit through wire 69 as indicated at 70. The wire 57, connected to the shoe 56, leads to one side of any suitable visible or audible signal, such as the lamp 71 shown in Fig. 6, which may be mounted upon the instrument panel or other suitable location for giving warning to the driver of the vehicle.

As shown in Fig. 6, a wire 72 leads from the other side of the lamp, or other warning signal, to the usual automobile battery 73, preferably through the ignition switch 74 so that the device may be operative only when the vehicle is being operated. As in usual practice the battery 73 is grounded as indicated at 75.

In order to inflate the tire, the usual mating hose connection from a pump, or air compressor, is connected to the right hand end of the pressure sensing unit, as viewed in Fig. 1. The action of this mating hose connection moves the valve stem 32 to the left, unseating the valve 33 from the end of the tubular member 31, and simultaneously moving the valve 35 to the open position, as shown in Fig. 8.

Compressed air will thus be permitted to enter the casing 28 and will flow through the ports 49 into the housing 16, and through the neck 21 thereof to the tire, and since the valves 33 and 35 are opened simultaneously, the compressed air will also flow from the casing 28 through the ports 39 into the bellows 37, so that the air pressure will be the same in both the tire and the bellows.

After the predetermined air pressure is reached in the tire, and also in the bellows 37, the mating hose coupling is removed, permitting the spring 34 to immediately move the valve stem 32 to the right, simultaneously moving the valves 33 and 35 to closed position, as shown in Fig. 1. Both the tire and the bellows are thus inflated at the same pressure and the air is sealed in the tire and the bellows, independently of each other, by the closing of the valves 33 and 35.

In this position the ball portion 44 of the electrical pick-off device will be centrally located within the ring portion 48 of the conductor 46 completing the circuit to the lamp 71, indicating to the driver of the vehicle that the tire is inflated to proper pressure.

In the event the air pressure in the tire drops a predetermined amount, or to the danger point, the pressure within the bellows 37 being greater than the pressure within the tire, will cause the bellows to expand, moving the ball 44 to the left and out of contact with the ring portion 48 and breaking the circuit to the lamp 71, and warning the driver that the tire is improperly inflated.

In the same manner, if the pressure in the tire builds up beyond the danger point, the tire pressure being greater than the pressure within the bellows, will cause the bellows to collapse sufficiently to move the ball 44 to the right, out of contact with the ring 48, breaking the circuit to the lamp 71 and warning the driver that the tire is improperly inflated.

Although the invention is illustrated and described as used with a normally closed circuit to the lamp, or other warning signal, it should be understood that a normally open circuit may be used and adapted to be closed when the pressure in the tire falls below or rises above the danger point.

It should be understood that while the circuit for one tire is illustrated and described, that in actual practice a similar circuit and similar pressure unit is provided for each tire, and the lamps, or other signals, may be properly marked so as to indicate immediately to the driver which tire or tires may be improperly inflated.

I claim:

1. A pressure indicating system for a pneumatic tire having a valve stem, said pressure indicating system comprising a pressure sensing unit having a housing with means at one end communicating with the valve stem of a tire, a tire valve in the other end of the housing, a bellows within the housing, means preventing communication between the bellows and the interior of the housing when the valve is closed, means providing communication between the valve, the interior of the bellows and the interior of the housing when the valve is open, so that the bellows and the tire may be inflated to equal pressure, an electrical circuit, a signal device in the circuit and an electrical pick-off device in the circuit comprising a movable contact connected to the bellows and a fixed contact within the housing, whereby changes in pressure within the tire will cause expansion or contraction of the bellows to operate the pick-off device and control the signal.

2. A pressure indicating system for a pneumatic tire having a valve stem, said pressure indicating system comprising a pressure sensing unit having a housing with means at one end communicating with the valve stem of a tire, a tire valve in the other end of the housing, a bellows within the housing, means preventing communication between the bellows and the interior of the housing when the valve is closed, means providing communication between the valve, the interior of the bellows and the interior of the housing when the valve is open, so that the bellows and the tire may be inflated to equal pressure, an electric circuit, a signal device in the circuit and an electrical pick-off device in the circuit comprising a movable contact connected to the bellows and a fixed ring contact within the housing through which the movable contact is slidably mounted, whereby changes in pressure within the tire will cause expansion or contraction of the bellows to operate the pick-off device and control the signal.

3. A pressure indicating system for a pneumatic tire having a valve stem, said pressure indicating system comprising a pressure sensing unit having a housing with means at one end communicating with the valve stem of a tire, a tire valve in the other end of the housing, a bellows within the housing, a bellows valve connected to the tire valve for preventing communication between the bellows and the interior of the housing when the tire valve is closed, means providing communication between the tire valve, the interior of the bellows and the interior of the housing when the tire valve is open, so that the bellows and the tire may be inflated to equal pressure, an electric circuit, a signal device in the circuit and an electrical pick-off device in the circuit comprising a movable contact connected to the bellows and a fixed contact within the housing, whereby changes in pressure within the tire will cause expansion or contraction of the bellows to operate the pick-off device and control the signal.

4. A pressure indicating system for a pneumatic tire having a valve stem, said pressure indicating system comprising a pressure sensing unit having a housing with means at one end communicating with the valve stem of a tire, a tire valve in the other end of the housing, a bellows within the housing, a bellows valve connected to the tire valve for preventing communication between the bellows and the interior of the housing when the tire valve is closed, means providing communication between the tire valve, the interior of the bellows and the interior of the housing when the tire valve is open, so that the bellows and the tire may be inflated to equal pressure, an electric circuit, a signal device in the circuit and an electrical pick-off device in the circuit comprising a movable contact connected to the bellows and a fixed ring contact within the housing through which the movable contact is slidably mounted, whereby changes in pressure within the tire will cause expansion or contraction of the bellows to operate the pick-off device and control the signal.

JAMES B. SHEA.

REFERENCES CITED

The following references are of record in the file of this patent:

UNITED STATES PATENTS

| Number | Name | Date |
| --- | --- | --- |
| 2,510,785 | Potts et al. | June 6, 1950 |

FOREIGN PATENTS

| Number | Country | Date |
| --- | --- | --- |
| 472,445 | Great Britain | Sept. 23, 1937 |